US012262706B1

(12) United States Patent
Walsh et al.

(10) Patent No.: US 12,262,706 B1
(45) Date of Patent: *Apr. 1, 2025

(54) DEVICE WITH SEALED SENSOR MODULE CASE BENEATH RODENT RUNWAY

(71) Applicant: Bell Laboratories, Inc., Windsor, WI (US)

(72) Inventors: James R. Walsh, Wauwatosa, WI (US); Patrick J. Lynch, Fort Lauderdale, FL (US)

(73) Assignee: Bell Laboratories, Inc., Windsor, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,110

(22) Filed: Nov. 20, 2023

Related U.S. Application Data

(63) Continuation of application No. 16/659,298, filed on Oct. 21, 2019, now Pat. No. 11,864,548.

(60) Provisional application No. 62/748,942, filed on Oct. 22, 2018.

(51) Int. Cl.
*A01M 23/38* (2006.01)
*A01M 23/08* (2006.01)
*G01D 5/24* (2006.01)

(52) U.S. Cl.
CPC ............ *A01M 23/38* (2013.01); *A01M 23/08* (2013.01); *G01D 5/24* (2013.01)

(58) Field of Classification Search
CPC ...... A01M 23/00; A01M 23/02; A01M 23/04; A01M 23/06; A01M 23/08; A01M 23/14; A01M 23/16; A01M 23/18; A01M 23/20; A01M 23/38

USPC ..... 43/58, 60, 61, 64–67, 69, 70, 73, 74, 98
See application file for complete search history.

(56) References Cited

U.S. PATENT DOCUMENTS

| 2,766,550 A | * | 10/1956 | Johnson | A01M 23/18 43/69 |
| 3,817,420 A | * | 6/1974 | Heisler | B65D 43/0208 220/276 |
| 5,027,972 A | * | 7/1991 | Bartholomew | B65D 81/3216 220/528 |

(Continued)

FOREIGN PATENT DOCUMENTS

| KR | 20080109307 A | 12/2008 |
| WO | 2007026123 A1 | 3/2007 |
| WO | 2017208068 A1 | 12/2017 |

*Primary Examiner* — Darren W Ark
*Assistant Examiner* — Kevin M Dennis
(74) *Attorney, Agent, or Firm* — Stiennon & Stiennon

(57) ABSTRACT

A base has a rodent inlet opening and interior walls which define a rodent runway which communicates with an interior compartment. A downwardly opening compartment with a cover defines a case for receiving a sensor module mounted beneath a threshold at the entry of the rodent runway to the interior compartment. Portions of the base bottom wall and the cover define a perimeter double lip on one of the base bottom wall and the cover which extends vertically beneath the compartment and is configured to extend around the sensor module and on the other of the base bottom wall and the cover there is a vertically protruding peripheral bead which extends between the perimeter double lip. The case encloses the sensor module and protects it from exposure to moisture, dirt, and rodent waste within the base interior.

8 Claims, 3 Drawing Sheets

(56) References Cited

U.S. PATENT DOCUMENTS

| | | | | |
|---|---|---|---|---|
| 5,953,853 A * | 9/1999 | Kim | ................... | A01M 23/38 43/61 |
| D459,428 S * | 6/2002 | Johnson | ................... | D22/119 |
| 6,481,151 B1 * | 11/2002 | Johnson | ................... | A01M 23/18 43/65 |
| 6,937,156 B2 * | 8/2005 | Gardner, Jr. | ................... | A01M 31/002 340/573.2 |
| 7,509,770 B2 * | 3/2009 | Gardner, Jr. | ................... | A01M 31/002 43/107 |
| 7,530,195 B2 * | 5/2009 | Muller | ................... | A01M 23/38 43/99 |
| 8,635,806 B2 * | 1/2014 | Gardner, Jr. | ................... | A01M 23/00 43/107 |
| 10,548,308 B2 * | 2/2020 | Howard | ................... | A01M 31/002 |
| 10,638,746 B2 * | 5/2020 | Howard | ................... | A01M 23/30 |
| 10,765,106 B2 * | 9/2020 | Crezee | ................... | A01M 31/002 |
| 10,897,887 B1 * | 1/2021 | Walsh | ................... | A01M 31/002 |
| 10,973,223 B2 * | 4/2021 | Howard | ................... | A01M 23/30 |
| 10,991,230 B2 * | 4/2021 | Triventi | ................... | A01M 23/16 |
| 11,116,203 B2 * | 9/2021 | Howard | ................... | A01M 1/026 |
| 11,337,416 B1 * | 5/2022 | Walsh | ................... | A01M 23/38 |
| 11,357,290 B2 * | 6/2022 | Walker | ................... | A43B 17/00 |
| 11,417,197 B2 * | 8/2022 | Triventi | ................... | A01M 25/004 |
| 2002/0054943 A1 * | 5/2002 | Flynn | ................... | B65D 77/003 53/442 |
| 2004/0216364 A1 * | 11/2004 | Gosselin | ................... | A01M 23/08 43/61 |
| 2006/0043115 A1 * | 3/2006 | Tanaka | ................... | B65G 65/46 222/181.1 |
| 2006/0123693 A1 * | 6/2006 | Muller | ................... | A01M 31/002 43/99 |
| 2007/0006489 A1 * | 1/2007 | Case | ................... | A43B 7/24 36/132 |
| 2007/0180736 A1 * | 8/2007 | DiBenedetto | ................... | A43B 21/26 36/132 |
| 2008/0223905 A1 * | 9/2008 | Horng | ................... | B23K 1/0016 228/45 |
| 2009/0192763 A1 * | 7/2009 | Gardner, Jr. | ................... | A01M 23/00 702/187 |
| 2012/0212338 A1 * | 8/2012 | Borth | ................... | A01M 31/002 340/539.1 |
| 2014/0165427 A1 * | 6/2014 | Molyneux | ................... | A43B 13/203 36/102 |
| 2018/0199565 A1 * | 7/2018 | Zosimadis | ................... | A01M 23/00 |
| 2018/0235205 A1 * | 8/2018 | Howard | ................... | A01M 23/30 |
| 2018/0301018 A1 | 10/2018 | Seifer et al. | | |
| 2019/0208865 A1 * | 7/2019 | Walker | ................... | G05B 15/02 |
| 2020/0005626 A1 * | 1/2020 | Triventi | ................... | G08B 25/10 |
| 2020/0221687 A1 * | 7/2020 | Howard | ................... | A01M 31/002 |
| 2020/0245611 A1 * | 8/2020 | Howard | ................... | A01M 31/002 |
| 2020/0349828 A1 * | 11/2020 | Triventi | ................... | A01M 1/026 |
| 2021/0185998 A1 * | 6/2021 | Siler | ................... | A01M 23/30 |
| 2021/0378231 A1 * | 12/2021 | Howard | ................... | A01M 23/30 |
| 2023/0041695 A1 * | 2/2023 | Triventi | ................... | A01M 23/16 |

\* cited by examiner

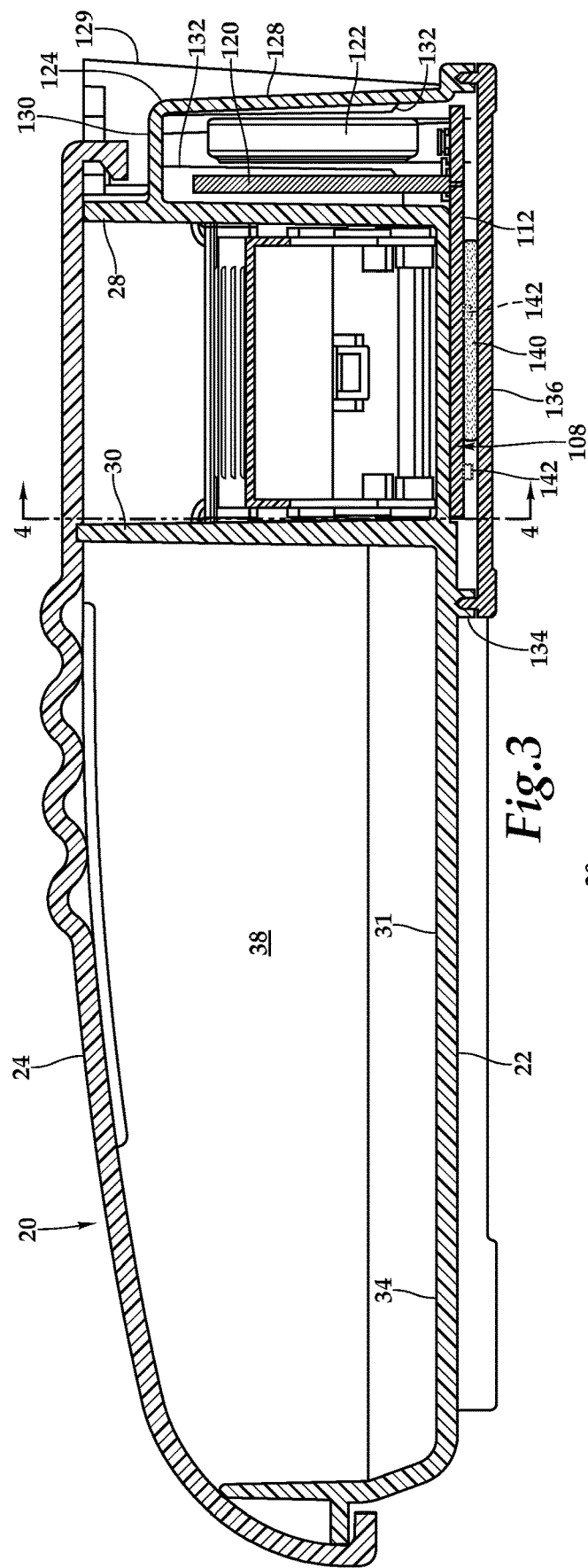
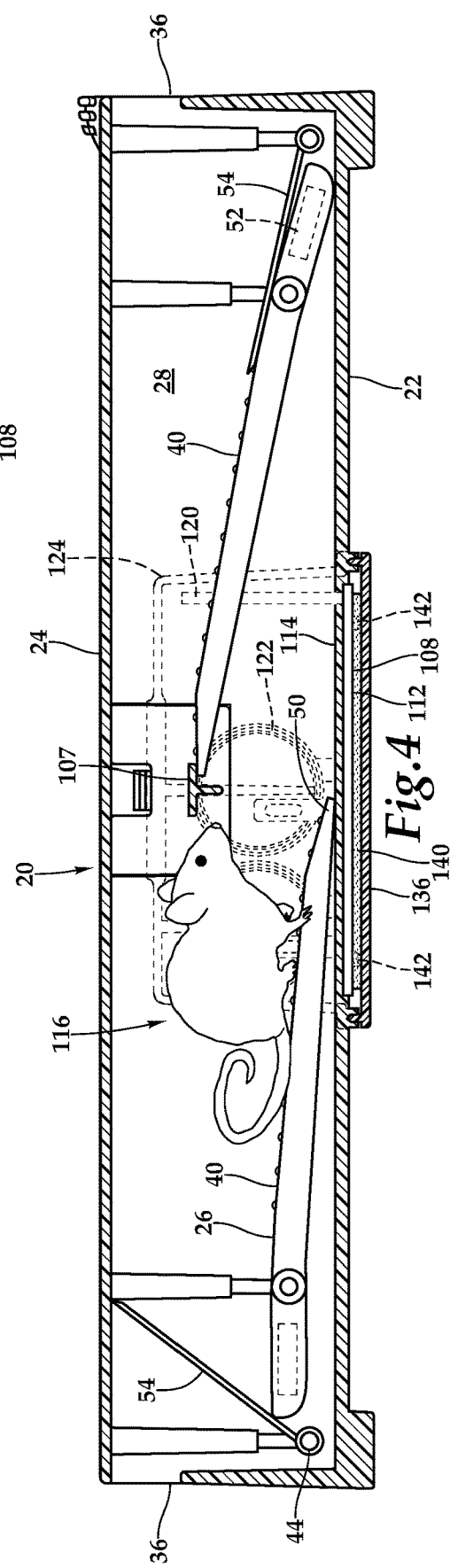

DEVICE WITH SEALED SENSOR MODULE CASE BENEATH RODENT RUNWAY

CROSS REFERENCES TO RELATED APPLICATIONS

This application is a continuation of U.S. application Ser. No. 16/659,298, filed Oct. 21, 2019, which claims priority on U.S. provisional App. No. 62/748,942, filed Oct. 22, 2018, the disclosure of both of which applications is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to rodent traps which can sequentially capture alive a plurality of mice, and more particularly to such traps which can send a signal to an operator indicating the quantity of rodents captured.

Problems with rodents are at least as old as the discovery of agriculture. Rodents carry disease, consume and spoil grain and foodstuffs, and can damage buildings and their contents. Various poisons are known to be effective in controlling pests, particularly rats and mice, however in many situations it is desirable to be sure that the rodents do not die in inaccessible portions of the building or dwelling, where decomposition can cause other unwanted problems.

Typically rodent poisons cause the animals to leave the building or dwelling in search of water, but in those situations where water is available within the building it is particularly desirable to use rodent control systems which capture rather than poison the undesirable vermin. Capturing the rodents allows the type and number of rodents present in the building or dwelling to be monitored, and so a number of traps may be used even in a situation where a majority of pest control is accomplished with poisoned bait.

Capturing vermin alive has advantages both in the simplicity of the trap and in avoiding the resultant mess which may result from the destruction of rodents during their capture. Repeating traps such as the one disclosed in U.S. Pat. No. 6,481,151, the disclosure of which is incorporated by reference herein, provide a narrow tunnel along one side of the box which forms the trap. As rodents are known to move along the walls of a room, and to be attracted to small openings or tunnels, the mice enter the tunnel formed along the side of the box and pass over a pivoting lever, crossing the axis and being discharged into an internal compartment.

After the mouse crosses the lever into the central volume of the box, the lever returns to its original position. A barrier is mounted to overlie the lever, preventing the rodent exiting the trap. Conventionally a Pest Control Operator (PCO) will visit an array of such traps in a particular installation, disposing of the captured rodents. However, assessment of the status of what may be numerous traps disposed throughout a facility can be time consuming, and the PCO must visit both actuated and unactuated traps in order to determine whether it needs to be cleared.

What is needed is a repeating rodent trap which can notify a PCO as to whether it has captured rodents and how many have been captured.

SUMMARY OF THE INVENTION

A rodent trap has a base with a rodent inlet opening and interior walls which define a rodent runway which communicates with a trap interior compartment. A sensor module is mounted beneath a threshold at the entry of the rodent runway to the trap interior compartment. The module has a capacitance sensor which detects the passage of a rodent into the interior compartment, and has a programmable controller which logs each rodent entry. The module has a Bluetooth transmitter which allows the module to communicate with a pest control operator to exchange the logged information. The trap is provided with a plastic case which encloses the sensor module and protects it from exposure to moisture, dirt, and rodent waste within the trap interior.

It is an object of the present invention to provide a repeating rodent trap which is configured to effectively house a sensor and electronics for detecting the introduction of rodents to the trap and sending a signal to indicate this.

Further objects, features and advantages of the invention will be apparent from the following detailed description when taken in conjunction with the accompanying drawings.

BRIEF DESCRIPTION OF THE DRAWINGS

FIG. 3 is a cross-sectional view of the trap of FIG. 2 taken along section line 3-3.

FIG. 4 is a cross-sectional view of the trap of FIG. 3 taken along section line 4-4.

DESCRIPTION OF THE PREFERRED EMBODIMENTS

Figure 1:
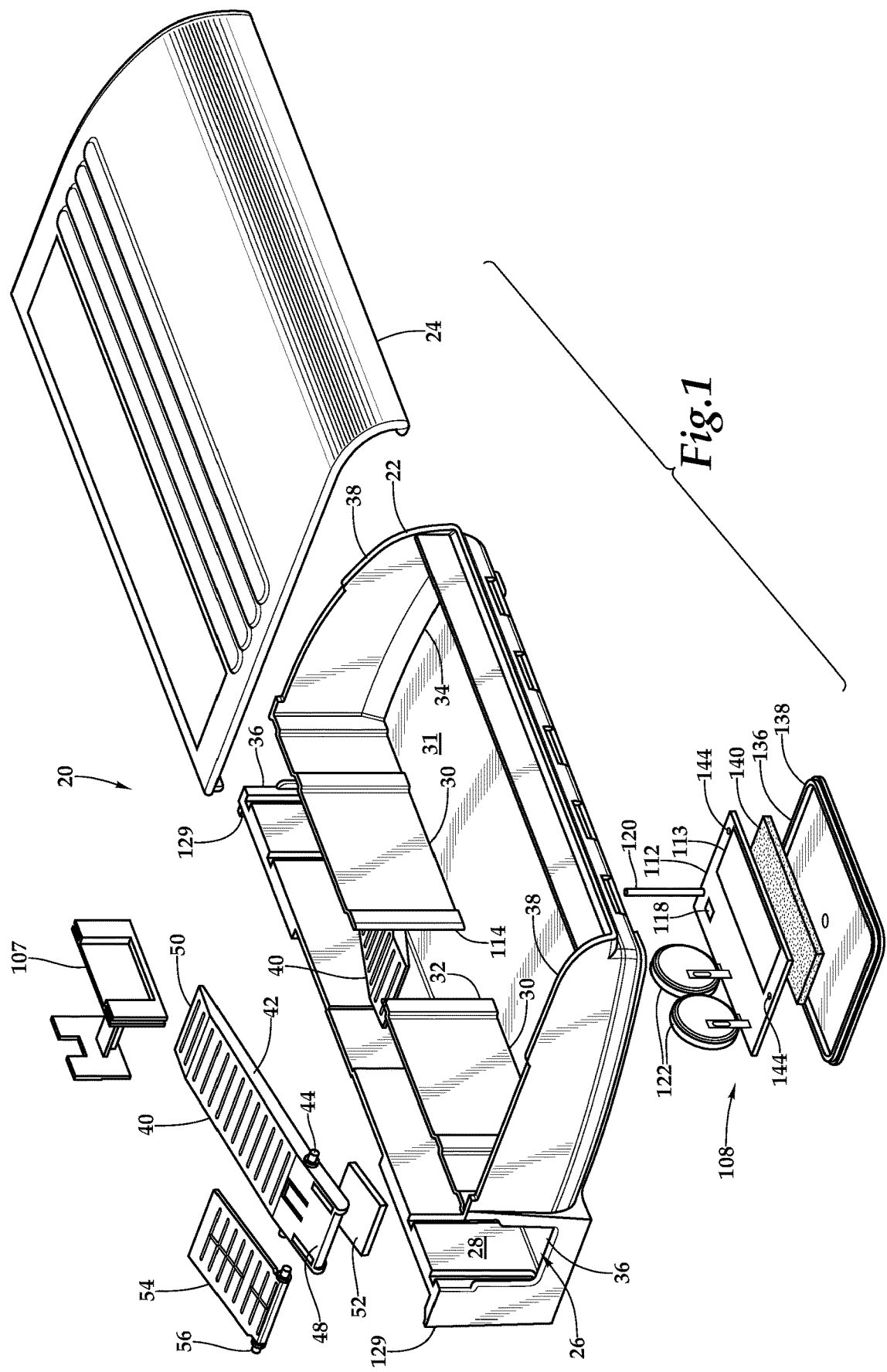
FIG. 1 is an exploded isometric view of a repeating rodent trap of this invention.

Referring more particularly to FIGS. 1-4, wherein like numbers refer to similar parts, a rodent trap 20 is shown. The trap 20 has an injection molded base 22 having an injection molded plastic lid 24 which is slidingly engaged with the base. A sensor module 108 is associated with the base to detect the entry of rodents as set out below. The lid 24 may be transparent or translucent to permit inspection of the trap contents. The base 22 has a rodent runway 26 defined between a rear exterior wall 28 and two interior walls 30. A gap 32 between the two interior walls 30 provides access from the rodent runway 26 to an interior rodent compartment 34. Rodent inlet openings 36 are defined in two opposed side walls 38 of the base 22. The trap 20 is provided with structure mounted to the base 22 and the lid 24 which permits the ready entrance of rodents into the rodent compartment 34 and which restricts their escape. The lid preferably can be withdrawn only in a single direction, and is slidable in the direction of the axis defined by the rodent runway. The lid has a rear flange and a front flange which engage with parallel portions of the base to constrain the lid 24 to move axially.

As shown in FIG. 1, a molded plastic entrance ramp 40 is pivotably mounted to the base in the runway 26 adjacent each inlet opening 36. The entrance ramp 40 has parallel side members 42 from which pivot pins 44 extend. The pivot pins 44 are received within mounting holes 46 formed in the exterior wall 28 and one of the interior walls 30. The pivot pins are positioned more closely to the outward end 48 of the ramp 40 than to the inward end 50. A counterweight 52, shown in FIGS. 1 and 4, is mounted near the outward end 48 of each ramp 40 which serves to retain the inward end 50 of the ramp elevated when no weight is placed on the ramp at a position inward of the pivot pins 44.

A molded plastic pivot barrier 54, as shown in FIG. 1, is shorter than the ramp 40, and is also mounted by sidewardly extending pivot pins 56 to holes molded into the rear exterior wall 28 and one of the interior walls 30. The pivot barrier 54 extends from the inlet opening 36 to about the position of the pivot axis of the ramp 40.

As a rodent approaches the trap 20, the pivot barrier 54 and the ramp 40 appear to form a nearly continuous pathway along the runway 26. As the rodent enters the runway 26 and treads upon the pivot barrier 54, the pivot barrier 54 is pressed down upon the ramp 40. As shown in FIG. 4, as the rodent moves past the ramp pivot axis defined between the opposed pivot pins 44, the ramp will begin to pivot downward. Proceeding along the ramp 40, the weight of the rodent will overcome the counterweight on the ramp 40, and the rodent will then pass over the ramp 40 and be discharged from the ramp at a position adjacent the gap 32 between the interior walls 30, providing entrance to the interior compartment 34. Once the rodent has stepped off the ramp 40, the ramp inward end 50 will return to an elevated position. The rodent is now trapped within the trap 20.

A center element 107, shown in FIG. 1, engages with the base above the rodent runway to prevent escape of the rodent from the trap 20. If a rodent is able to move back onto the ramp 40, the downward pivoting of the inward end of the ramp will cause the pivot barrier 54 to rotate outwardly and block the lower part of the inlet opening 36.

The rodent trap 20 will typically be placed along a building wall with the rodent runway 26 positioned adjacent the wall. By providing rodent inlet openings 36 onto both ends of the runway 26 mice approaching the trap from either side may enter.

Electronic monitoring is achieved by the sensor module 108 which is sealed within a case 124 within the base 22. The sensor module 108 is positioned within the case 124 beneath the rodent runway 26 and senses the presence of a rodent as it passes along the rodent runway into the interior compartment 34 and passes over the sensor module. The sensor module technology may employ a standard FR4 printed circuit board (PCB) 112 on which is attached a conductive plate 113 forming a capacitive sensor which is positioned beneath a threshold 114 defined by the bottom wall 31 of the base 22 where the rodent runway 26 extends adjacent the gap 32 between the interior walls 30 of the base. A rodent 116 must pass over the threshold to enter the interior compartment 34. On the same PCB 112 are mounted a Bluetooth chip set and programmable controller 118, an antenna 120, a power supply comprising one or more batteries, such as long life lithium cells 122, a controller with programmable functionality, and a circuit which detects a change in the capacitance of the conductive plate 113, thus forming a capacitance sensor. A capacitance sensor can sense through plastic and can sense all types of material including rodents. Thus the sensor module 108 containing the capacitance sensor can be sealed from the environment within a plastic case 124 forming a part of the base 22. The life of the electronic module is thereby preserved as it is isolated from moisture, dirt, and rodent waste on the interior of the trap 20.

Figure 2:
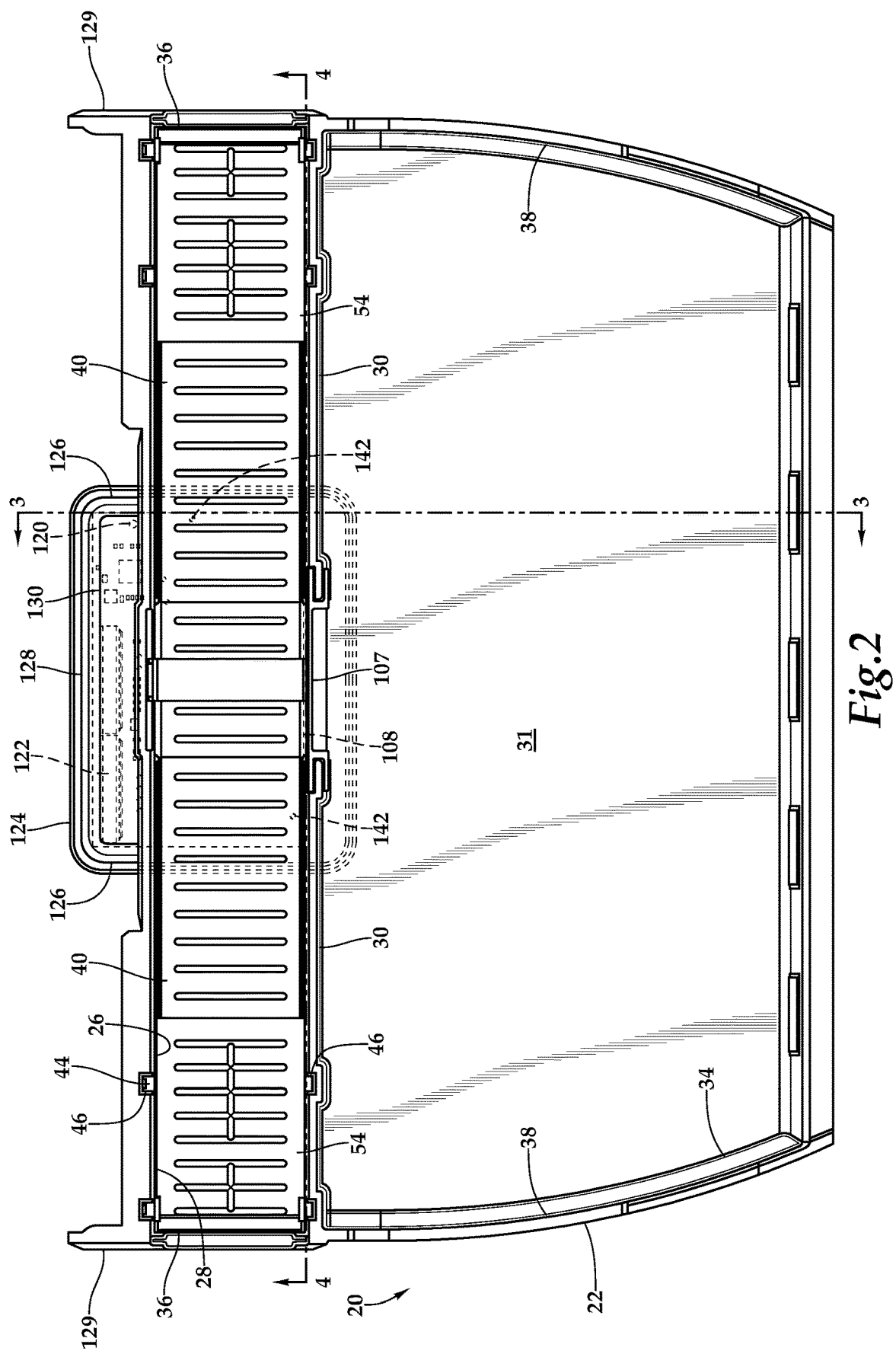
FIG. 2 is a top plan view of the trap of FIG. 1 with the cover removed.

As shown in FIG. 2, the case 124 has rearwardly extending side walls 126 which project from the rear exterior wall 28 of the base, and which are joined by a case rear wall 128 and a case top wall 130. The sensor module 108 is received within the case 124 with the batteries 122 and the antenna 120 extending vertically between the base rear exterior wall 28 and the case rear wall 128 as shown in FIG. 3. Vertically extending ribs 132 may be formed on the case rear wall 128 and the base rear exterior wall 28 to extend frontwardly, as shown in FIG. 3, to restrict the position of the batteries 122 of the sensor module 108. The case 124 further extends beneath the bottom wall 31 of the base, and has a downwardly extending double peripheral lip 134. A case cover 136, shown in FIG. 1, has a protruding peripheral bead 138 which extends between the double peripheral lip 134 extending from the base bottom wall 31. The case cover 136 may be affixed in place such as by ultrasonic welding or glue to seal the compartment and protect the electronics of the sensor module 108 from moisture. A resilient foam strip 140, shown in FIGS. 1 and 3, is adhered to the case cover 136 beneath the PCB 112, and serves to urge the PCB 112 upward against the bottom wall 31 of the base. As shown in FIGS. 2-4, the underside of the base bottom wall 31 may have a plurality of downwardly extending molded plastic pins 142 which extend into pin holes 144 which extend through the PCB 112, as shown in FIG. 1. The pins 142 serve to register the position of the PCB 112 with respect to the threshold 114.

As shown in FIGS. 2 and 3, the base 22 has rearwardly projecting stub walls 129 which extend about the distance of the case 124 rearwardly from the base. The stub walls 129 block access to a rodent to the space between the rear exterior wall 28 and a building wall (not shown).

As shown in FIG. 4, when the capacitive sensor detects a signal indicative of a rodent 116 passing over the conductive plate 113, the rodent's passage is electronically entered by the programmable controller in a log with a time and date stamp, and the signals so detected are gated such that only a single detection is reported within a given timeframe, for example 30 minutes. A PCO or other operator passing within the vicinity of the sensor module with an electronic device can determine the presence of rodents within the trap. When an external Bluetooth communication link, such as that provided by a PCO's smart phone running an app, interrogates the sensor module 108, the module communicates the contents of the log to the smart phone for recognition within the app. The antenna 120 broadcasts the signal for reception by the external receiving device such as a smart phone. The sensor module log contents may simply indicate whether the trap 20 has been visited or not, and include the times, if any, when the trap was visited by the PCO. Each sensor module 108 in each trap 20 has a unique identifier, so the app can keep track of the multiple traps deployed and provide such functionality as indicating when a signal has been received from all bait stations at a particular location and provide a map to any bait stations which have been visited. Depending on the bluetooth transceiver power and sensitivity of the sensor module and of the smart phone, the sensor module may require the Pest Control Operator to traverse within a certain distance of each trap. In other circumstances the sensor module may have enough range that it is sufficient simply to travel to various deployment areas which can be checked without walking the line along which the traps are deployed. In either case the substantial effort in opening every station and determining the status of the bait and logging the presence and status of the bait stations no longer needs to be done manually by the Pest Control Operator.

It should be understood that the term sensor module is not used as a generic or a nonce term. Applicant has disclosed a particular sensor module and described the general elements contained therein, but the term includes any device incorporating: a power source, a radio transceiver, and a sensor which can detect a rodent passing over a threshold on a rodent trap, connected together to transmit a signal that a rodent has passed over the threshold. Although a capacitance sensor is shown and described, other sensors may be used which can detect through a portion of the bait tray such as seismic, shock, sonic, ultrasonic, and electromagnetic including radio frequency radar.

It is understood that the invention is not limited to the particular construction and arrangement of parts herein illustrated and described, but embraces all such modified forms thereof as come within the scope of the following claims.

We claim:

1. An assembly for housing a sensor module to detect passage of rodents into the assembly, the assembly comprising:
    a base having an upwardly extending rear wall, and at least one interior wall spaced from the rear wall to define a rodent runway extending between the at least one interior wall and the rear wall, the rodent runway extending from an inlet and communicating with an interior compartment;
    a lid mounted to the base;
    portions of the base which define a bottom wall over which the rodent runway extends, the bottom wall having portions defining a threshold along the rodent runway over which a rodent must pass to enter the interior compartment;
    a case defined extending from the base beneath the threshold, the case having a downwardly extending volume;
    a case cover which is secured to the base to close the downwardly extending volume;
    wherein the case is configured to accommodate the sensor module disposed within the case and positioned beneath the threshold of the base to thereby detect the passage of the rodent into the interior compartment; and
    portions of the base bottom wall and the cover which define a perimeter double lip on one of the base bottom wall and the cover which extends vertically beneath the downwardly extending volume and is configured to extend around the sensor module and on the other of the base bottom wall and the cover there is a vertically protruding peripheral bead which extends between the perimeter double lip.

2. The assembly of claim 1 wherein the cover is affixed in place to a case side wall by glue or ultrasonic welding to define a sealed compartment configured to protect the sensor module from moisture.

3. The assembly of claim 1 wherein the rodent runway extends from a first inlet at one end to a second inlet at an opposite end, such that rodents may reach the threshold from either the first inlet or the second inlet.

4. The assembly of claim 1 wherein the case is configured to receive portions of at least one battery and an upwardly extending antenna to extend upwardly within the case.

5. Portions of a rodent device for housing a sensor module to detect passage of rodents into the device, the portions comprising:
    a base bottom wall;
    a rear wall which extends upwardly from the base bottom wall;
    at least one interior wall extending upwardly from the base bottom wall and spaced from the rear wall to define a rodent runway extending between the at least one interior wall and the rear wall, the rodent runway extending from an inlet and communicating with an interior compartment positioned above the base bottom wall;
    a lid positioned to overlie the base bottom wall;
    portions of the base bottom wall which define a threshold along the rodent runway over which a rodent must pass to enter the interior compartment;
    a case defined extending from the base bottom wall beneath the threshold, the case having a downwardly extending volume defined between a case peripheral wall extending beneath the base bottom wall and a case cover, wherein the case cover is positioned beneath the base bottom wall and is secured to the case peripheral wall to close the downwardly extending volume;
    wherein the case is configured to accommodate the sensor module disposed within the case and positioned beneath the threshold of the base to thereby detect the passage of the rodent into the interior compartment; and
    portions of the case peripheral wall and the cover which define a perimeter double lip on one of the case peripheral wall and the cover which extends vertically beneath the threshold and is configured to extend around the sensor module and on the other of the case peripheral wall and the cover there is a vertically protruding peripheral bead which extends between the perimeter double lip.

6. The portions of a rodent device of claim 5 wherein the cover is affixed in place to the case peripheral wall by glue or ultrasonic welding to define a sealed compartment configured to protect the sensor module from moisture.

7. The portions of a rodent device of claim 5 wherein the rodent runway extends from a first inlet at one end of the base bottom wall to a second inlet at an opposite end, such that rodents may reach the threshold from either the first inlet or the second inlet.

8. The portions of a rodent device of claim 5 wherein the case is configured to receive portions of at least one battery and an upwardly extending antenna to extend upwardly within the case.

* * * * *